(12) United States Patent
Englund et al.

(10) Patent No.: US 12,175,333 B2
(45) Date of Patent: Dec. 24, 2024

(54) OPTICALLY HERALDED ENTANGLEMENT OF SUPERCONDUCTING SYSTEMS IN QUANTUM NETWORKS

(71) Applicant: Massachusetts Institute of Technology, Cambridge, MA (US)

(72) Inventors: Dirk Robert Englund, Brookline, MA (US); Stefan Ivanov Krastanov, Boston, MA (US); Hamza Raniwala, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 616 days.

(21) Appl. No.: 17/496,833

(22) Filed: Oct. 8, 2021

(65) Prior Publication Data

US 2022/0215281 A1 Jul. 7, 2022

Related U.S. Application Data

(60) Provisional application No. 63/122,741, filed on Dec. 8, 2020.

(51) Int. Cl.
*G06N 10/40* (2022.01)
(52) U.S. Cl.
CPC .................... *G06N 10/40* (2022.01)
(58) Field of Classification Search
CPC ........ G06N 10/00; G06N 10/20; G06N 10/40; G06N 10/60; G06N 10/70; G06N 10/80
(Continued)

(56) References Cited

U.S. PATENT DOCUMENTS

2016/0337037 A1* 11/2016 Fevrier ................ H04B 10/275
2019/0349112 A1* 11/2019 Seno ..................... G02F 1/31
(Continued)

OTHER PUBLICATIONS

Andrews et al. "Bidirectional and efficient conversion between microwave and optical light." Nature Physics 10.4 (2014): 321-326.
(Continued)

*Primary Examiner* — Paul Dinh
(74) *Attorney, Agent, or Firm* — Smith Baluch LLP

(57) ABSTRACT

The typical approach to transfer quantum information between two superconducting quantum computers is to transduce the quantum information into the optical regime at the first superconducting quantum computer, transmit the quantum information in the optical regime to the second superconducting quantum computer, and then transduce the quantum information back into the microwave regime at the second superconducting quantum computer. However, direct microwave-to-optical and optical-to-microwave transduction have low fidelity due to the low microwave-optical coupling rates and added noise. These problems compound in consecutive microwave-to-optical and optical-to-microwave transduction steps. We break this rate-fidelity trade-off by heralding end-to-end entanglement with one detected photon and teleportation. In contrast to cascaded direct transduction, our technology absorbs the low optical-microwave coupling efficiency into the entanglement heralding step. Our approach unifies and simplifies entanglement generation between superconducting devices and other physical modalities in quantum networks.

19 Claims, 5 Drawing Sheets

Figure 1A:
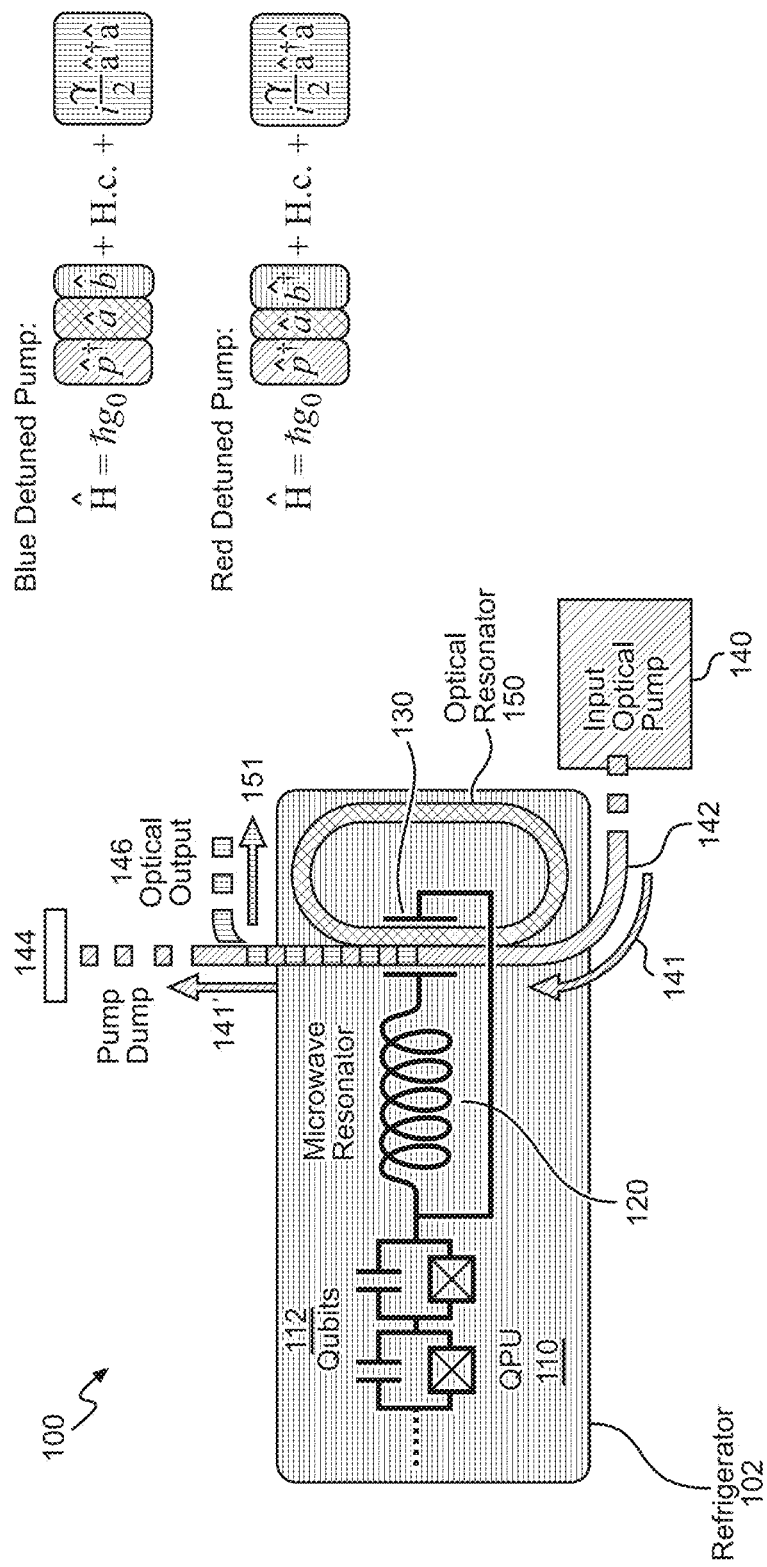

(58) Field of Classification Search
USPC .......................................................... 716/100
See application file for complete search history.

(56) References Cited

U.S. PATENT DOCUMENTS

| | | | | |
|---|---|---|---|---|
| 2020/0169320 A1* | 5/2020 | Kiyama | ............. | H04B 10/0779 |
| 2022/0222567 A1* | 7/2022 | Reagor | .................. | G06N 10/40 |
| 2023/0082032 A1* | 3/2023 | Honda | ................ | H04J 14/0212 |
| | | | | 398/25 |

OTHER PUBLICATIONS

Axline et al. "On-demand quantum state transfer and entanglement between remote microwave cavity memories." Nature Physics 14.7 (2018): 705-710.
Bagci et al. "Optical detection of radio waves through a nanomechanical transducer." Nature 507.7490 (2014): 81-85.
Balram et al. "Coherent coupling between radiofrequency, optical and acoustic waves in piezo-optomechanical circuits." Nature Photonics 10.5 (2016): 346-352.
Bartholomew et al. "On-chip coherent microwave-to-optical transduction mediated by ytterbium in YVO4." Nature Communications 11.1 (2020): 1-6.
Barzanjeh et al. "Reversible optical-to-microwave quantum interface." Physical Review Letters 109.13 (2012): 130503 5 pages.
Bennett et al. "Mixed-state entanglement and quantum error correction." Physical Review A 54.5 (1996): 3824. 28 pages.
Bochmann et al. "Nanomechanical coupling between microwave and optical photons." Nature Physics 9.11 (2013): 712-716.
Campagne-Ibarcq et al. "Deterministic remote entanglement of superconducting circuits through microwave two- photon transitions." Physical Review Letters 120.20 (2018): 200501. 6 pages.
Cirac et al. "Quantum state transfer and entanglement distribution among distant nodes in a quantum network." Physical Review Letters 78.16 (1997): 3221. 4 pages.
Couteau "Spontaneous parametric down-conversion." Contemporary Physics 59.3 (2018): 291-304.
Covey et al. "Microwave-to-optical conversion via four-wave mixing in a cold ytterbium ensemble." Physical Review A 100.1 (2019): 012307. 9 pages.
Dauler et al. "Review of superconducting nanowire single-photon detector system design options and demonstrated performance." Optical Engineering 53.8 (2014): 081907. 14 pages.
Davis Search for neutrinoless double-beta decay with Majoron emission in Cuore. Diss. Yale University, 2020. 232 pages.
Duan et al. "Long-distance quantum communication with atomic ensembles and linear optics." Nature 414.6862 (2001): 413-418.
Dum et al. "Monte Carlo simulation of the atomic master equation for spontaneous emission." Physical Review A 45.7 (1992): 4879. 9 pages.
Everts et al. "Microwave to optical photon conversion via fully concentrated rare-earth-ion crystals." Physical Review A 99.6 (2019): 063830. 9 pages.
Fan et al. "Cavity electro-optic circuit for microwave-to-optical frequency conversion." Nonlinear Optics. Optical Society of America, 2019. 2 pages.
Fan et al. "Superconducting cavity electro-optics: a platform for coherent photon conversion between superconducting and photonic circuits." Science Advances 4.8 (2018): eaar4994.
Fu et al. "Cavity electro-optic circuit for microwave-to-optical conversion in the quantum ground state." Physical Review A 103.5 (2021): 053504. 8 pages.
Gard et al. "Microwave-to-optical frequency conversion using a cesium atom coupled to a superconducting resonator." Physical Review A 96.1 (2017): 013833. 10 pages.
Guo et al. "Parametric down-conversion photon-pair source on a nanophotonic chip." Light: Science & Applications 6.5 (2017): e16249-e16249. 8 pages.
Hease et al. "Bidirectional electro-optic wavelength conversion in the quantum ground state." PRX Quantum 1.2 (2020): 020315.
Higginbotham et al. "Harnessing electro-optic correlations in an efficient mechanical converter." Nature Physics 14.10 (2018): 1038-1042.
Holzgrafe et al. "Cavity electro-optics in thin-film lithium niobate for efficient microwave-to-optical transduction." Optica 7.12 (2020): 1714-1720.
Jiang et al. "Efficient bidirectional piezo-optomechanical transduction between microwave and optical frequency." Nature Communications 11.1 (2020): 1-7.
Kjaergaard et al. "Superconducting qubits: Current state of play." Annual Review of Condensed Matter Physics 11 (2020): 369-395.
Krastanov et al. "Optimized entanglement purification." Quantum 3 (2019): 123. 18 pages.
Krastanov et al., "Optically Heralded Entanglement of Superconducting Systems in Quantum Networks," Physical Review Letters 127, 040503 (2021), 7 pages.
Kreikebaum et al. "Optimization of infrared and magnetic shielding of superconducting TiN and Al coplanar microwave resonators." Superconductor Science and Technology 29.10 (2016): 104002. 5 pages.
Kurpiers et al. "Deterministic quantum state transfer and remote entanglement using microwave photons." Nature 558.7709 (2018): 264-267.
Lauk et al. "Perspectives on quantum transduction." Quantum Science and Technology 5.2 (2020): 020501. 16 pages.
Marsili et al. "Detecting single infrared photons with 93% system efficiency." Nature Photonics 7.3 (2013): 210-214.
McKenna et al. "Cryogenic microwave-to-optical conversion using a triply resonant lithium-niobate-on-sapphire transducer." Optica 7.12 (2020): 1737-1745.
Mirhosseini et al. "Superconducting qubit to optical photon transduction." Nature 588.7839 (2020): 599-603.
Mobassem et al. "Thermal Noise in Electro-Optic Devices at Cryogenic Temperatures." arXiv preprint arXiv:2008.08764 (2020). 9 pages.
MøLMER et al. "Monte Carlo wave-function method in quantum optics." JOSA B 10.3 (1993): 524-538.
Neuman et al. "A phononic bus for coherent interfaces between a superconducting quantum processor, spin memory, and photonic quantum networks." arXiv preprint arXiv:2003.08383 (2020). 17 pages.
Orcutt et al. "Engineering electro-optics in SiGe/Si waveguides for quantum transduction." Quantum Science and Technology 5.3 (2020): 034006. 14 pages.
Piekarek et al. "High-extinction ratio integrated photonic filters for silicon quantum photonics." Optics Letters 42.4 (2017): 815-818.
Rueda "Frequency-multiplexed hybrid optical entangled source based on the Pockels effect." Physical Review A 103.2 (2021): 023708. 14 pages.
Rueda et al. "Efficient microwave to optical photon conversion: an electro-optical realization." Optica 3.6 (2016): 597-604.
Rueda et al. "Electro-optic entanglement source for microwave to telecom quantum state transfer." npj Quantum Information 5.1 (2019): 1-11.
Safavi-Naeini et al.. "Proposal for an optomechanical traveling wave phonon-photon translator." New Journal of Physics 13.1 (2011): 013017 31 pages.
Singh et al. "The CUORE cryostat: commissioning and performance." Journal of Physics: Conference Series. vol. 718. No. 6. IOP Publishing, 2016. 6 pages.
Stannigel et al. "Optomechanical transducers for long-distance quantum communication." Physical Review Letters 105.22 (2010): 220501. 4 pages.
Tian "Adiabatic state conversion and pulse transmission in optomechanical systems." Physical Review Letters 108.15 (2012): 153604. 5 pages.
Tian "Optoelectromechanical transducer: Reversible conversion between microwave and optical photons." Annalen der Physik 527.1-2 (2015): 1-14.

(56) References Cited

OTHER PUBLICATIONS

Wang et al. "Monolithic lithium niobate photonic circuits for Kerr frequency comb generation and modulation." Nature Communications 10.1 (2019): 1-6.
Wang et al. "Using interference for high fidelity quantum state transfer in optomechanics." Physical Review Letters 108.15 (2012): 153603. 5 pages.
Wehner et al. "Quantum internet: A vision for the road ahead." Science 362.6412 (2018): eaam9288. 11 pages.
Welinski et al. "Electron spin coherence in optically excited states of rare-earth ions for microwave to optical quantum transducers." Physical Review Letters 122.24 (2019): 247401. 6 pages.
Wenner et al. "Catching time-reversed microwave coherent state photons with 99.4% absorption efficiency." Physical Review Letters 112.21 (2014): 210501. 5 pages.
Wu et al. "Microwave-to-optical transduction using a mechanical supermode for coupling piezoelectric and optomechanical resonators." Physical Review Applied 13.1 (2020): 014027 30 pages.
Xu et al. "Radiative cooling of a superconducting resonator." Physical Review Letters 124.3 (2020): 033602. 6 pages.
Zhong et al. "Entanglement of microwave-optical modes in a strongly coupled electro-optomechanical system." Physical Review A 101.3 (2020): 032345. 9 pages.
Zhong et al. "Proposal for heralded generation and detection of entangled microwave-optical-photon pairs." Physical Review Letters 124.1 (2020): 010511.
Zhu et al. "Preparation of entangled states of microwave photons in a hybrid system via the electro-optic effect." Optics Express 25.23 (2017): 28305-28318.

\* cited by examiner

OPTICALLY HERALDED ENTANGLEMENT OF SUPERCONDUCTING SYSTEMS IN QUANTUM NETWORKS

CROSS-REFERENCE TO RELATED APPLICATION(S)

This application claims the priority benefit, under 35 U.S.C. § 119(e), of U.S. Application No. 63/122,741, which was filed on Dec. 8, 2020, and is incorporated herein by references in its entirety for all purposes.

GOVERNMENT SUPPORT

This invention was made with government support under PHY1734011 awarded by the National Science Foundation. The government has certain rights in the invention.

BACKGROUND

A quantum computer uses the superposition and entanglement of quantum states to perform computations, including factoring large integers. The computations are typically represented as a set of quantum logic gates, such as the controlled NOT (CNOT) gate, that operate on quantum bits (qubits). Just like the bit is the basic unit of information in a classical computer, the qubit is the basic unit of information in a quantum information. Like a classical bit, a qubit is represented by a physical system (e.g., an electron or a photon) and has two states (e.g., representing logical 1 or 0). Unlike a classical bit, however, a qubit can be in a superposition of both states simultaneously and can be entangled without other qubits.

In a superconducting quantum computer, qubits and quantum logic gates are implemented as superconducting electronic circuits. Examples of superconducting qubits include the charge qubit, which is a superconducting island between a capacitance and a Josephson junction; the radio-frequency (RF) superconducting quantum interference device (SQUID) qubit, which is a superconducting loop interrupted by a Josephson junction; the phase qubit, which is a Josephson junction biased by a current; and the transmission line shunted plasma oscillation (transmon) qubit, which is a Cooper-pair box where the two superconductors are also capacitively shunted to reduce their sensitivity to charge noise, while maintaining a sufficient anharmonicity for selective qubit control. In operation, superconducting qubits are typically contained in refrigerators or cryogenic coolers that cool them to cryogenic temperatures (temperatures of about 0 K to about 120 K, e.g., about 1 K).

SUMMARY

A central challenge in quantum information science is to transfer quantum states between superconducting systems, potentially over long distances. This is especially challenging for transferring quantum states between superconducting qubits cooled to cryogenic temperatures in separate refrigerators, possibly separated by kilometers or more. Superconducting electrical connections between separate refrigerators would have to be cooled to cryogenic temperatures, which is impractical over distances larger than a few meters.

One way to circumvent the need for superconducting connections between widely separated superconducting qubits is to transduce the quantum information encoded in a superconducting qubit into photons, which can be transmitted at room temperature over long distances with low loss. This type of transduction is called microwave-optical (M-O) quantum state transduction and has been investigated widely. However, despite concerted effort and tremendous progress in direct M-O transduction, it remains extremely challenging to achieve a high transduction efficiency without adding significant noise. Moreover, the efficiency and noise challenges are compounded because a full state transfer between two quantum devices involves sequential M-O and O-M transduction steps.

Here, we replace these M-O-M transduction steps with one round of optically heralded microwave-microwave (M-M) entanglement (involving the detection of a single photon), followed by state teleportation between the quantum devices. Heralding indicates that the quantum devices have been entangled successfully. In contrast to direct M-O transduction, this photon-heralded entanglement scheme exploits low M-O coupling efficiency to eliminate added noise, while assuring on-demand state teleportation by heralding and distilling M-M Bell pairs faster than their decoherence rates. Specifically, on present-day hardware, the entanglement rates could exceed 100 kHz per channel, the entanglement fidelity could exceed 0.99, and the entanglement purification (reduction or removal of effects of decoherence) could reach a fidelity of 0.999. Leveraging standard telecom equipment, dense wavelength division multiplexing can boost entanglement rates by an order of magnitude. Our approach also allows efficient and high-fidelity heralded state transfer to other physical modalities including trapped ions, cold atoms, solid-state spin systems, or another traveling photon (corresponding to heralded M-O quantum state transduction). Our approach unifies and simplifies entanglement generation between superconducting devices and other physical modalities in quantum networks.

Our approach can be implemented as a method of entangling a first superconducting qubit in a first node and a second superconducting qubit in a second node. The first and second nodes can be cooled to 120 K in first and second refrigerators, respectively, and can be coupled by an optical fiber or other optical link that is at a temperature greater than 120 K (e.g., at about 300 K). This method comprises generating a microwave photon and an optical photon at the first node, then coupling the microwave photon to the first superconducting qubit. The optical photon is coupled to a beam splitter that is in optical communication with the first and second nodes. The beam splitter erases information about which node generated the optical photon. A photodetector coupled to an output of the beam splitter senses the optical photon to herald entanglement of the first and second superconducting qubits.

Generating the microwave photon and the optical photon can include coupling pulses from a pump laser to a transducer in the first node and to a transducer in the second node. The transducer in the first node converts a pump pulse to the microwave photon and the optical photon. The transducer generates the microwave photon at a resonance frequency of a microwave resonator coupled to the first qubit and to the transducer. It generates the optical photon at a resonance frequency of an optical resonator coupled to the transducer. The transducer can generate the microwave and optical photons via an interaction between a nonlinear medium and a pump photon at a frequency equal to a sum of a frequency of the microwave photon and a frequency of the optical photon.

Coupling the optical photon to the beam splitter can comprise guiding the optical photon through an optical fiber with a length of at least 1 km. A reconfigurable add-drop multiplexer (ROADM) can couple the optical photon from the first node to the beam splitter. In some cases, the first node generates another microwave photon and another optical photon, and the ROADM couples the other optical photon to the beam splitter. The photodetector coupled to the output of the beam splitter detects this other optical photon to herald entanglement of the first superconducting qubit with a qubit in the third node. The third qubit can be a third superconducting qubit, a color center qubit, or a trapped ion qubit.

This method can be carried out in a quantum optical network that includes a pump laser, first node, second node, beam splitter, first photodetector, and second photodetector. The first node is in optical communication with the pump laser and comprises a first superconducting qubit and a first transducer in electromagnetic communication with each other. Similarly, the second node is in optical communication with the pump laser and comprises a second superconducting qubit and a second transducer in electromagnetic communication with each other. In operation, the pump laser generates at least a first pump photon and a second pump photon. The first and second transducers generate a first microwave photon and a first optical photon from the first pump photon and a second microwave photon and a second optical photon from the second pump photon, respectively. The beam splitter is in optical communication with the first and second nodes. The beam splitter is configured to receive the first optical photon from the first node, to receive the second optical photon from the second node, and to erase information about which of the first node and the second node generated the optical photon. The first and second photodetectors are in optical communication with the first and second output ports, respectively, of the beam splitter and are configured to detect the first or second optical photon. Detection of the first and/or second optical photons heralds entanglement of the first and second superconducting qubits.

The first node can comprise a first optical resonator coupled to the transducer and the pump laser is blue-detuned from resonance with the first optical resonator. The first node may also include a first microwave resonator coupled to the first transducer. The second node can include a second optical resonator having a resonance frequency equal to a resonance frequency of the first optical resonator.

The quantum optical network can include a ROADM, in optical communication with the first node, the second node, and the beam splitter, to couple the first optical photon from the first node to the beam splitter and/or to couple the second optical photon from the second node to the beam splitter. A third node, in optical communication with the ROADM, can generate a third optical photon for heralding entanglement of a qubit in the third node with one of the first superconducting qubit or the second superconducting qubit.

Another implementation of a quantum optical network may include a pump laser to generate pump pulses, a ROADM, a plurality of nodes, and a plurality of path-erasure photodetectors. The nodes are in optical communication with the pump laser via the ROADM. At least one node includes superconducting qubits configured to generate pairs of spectrally multiplexed optical photons and microwave photons from the pump pulses. The path-erasure photodetectors are in optical communication with the plurality of nodes via the ROADM. The path-erasure photodetectors detect the optical photons while erasing information about paths taken by the optical photons. Detection of the optical photons herald entanglement of the superconducting qubits with qubits in other nodes in the plurality of nodes.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows a superconducting quantum node with transduction hardware, here utilizing a $\chi^{(2)}$ process whereby a classical pump enables a beam-splitter Hamiltonian between an optical mode supported by an optical resonator and a microwave mode supported by a microwave resonator coupled to the optical resonator by a transducer comprising $\chi^{(2)}$ nonlinear material.

Figure 1B:
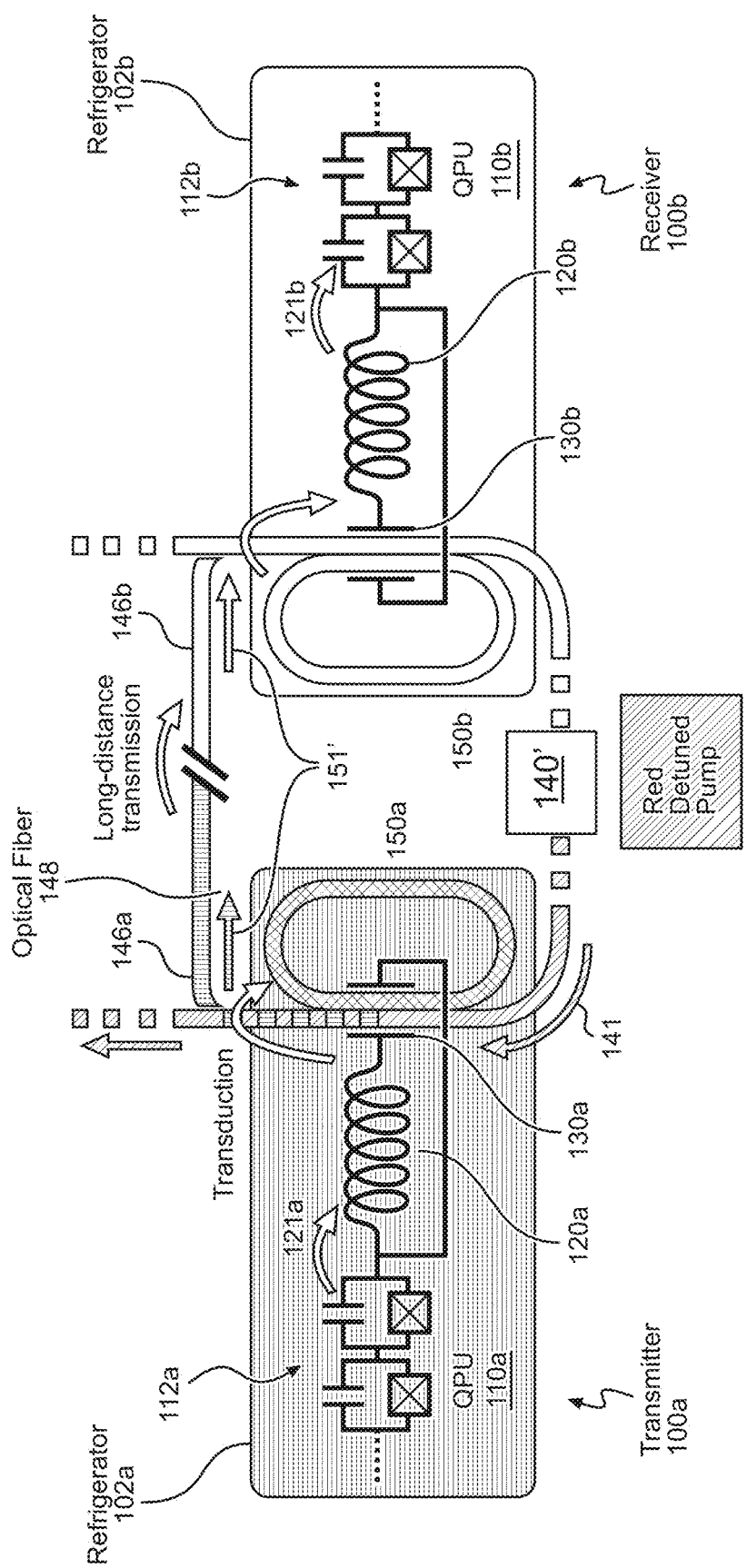

FIG. 1B illustrates superconducting quantum nodes coupled to each other and to a pump that is red-detuned from the optical mode. This enables a beam splitter interaction that can transduce a microwave state into an optical state, which is then transmitted over a fiber to a distant node where the same process is used to transduce it back. This is a deterministic, low-fidelity operation.

Figure 1C:
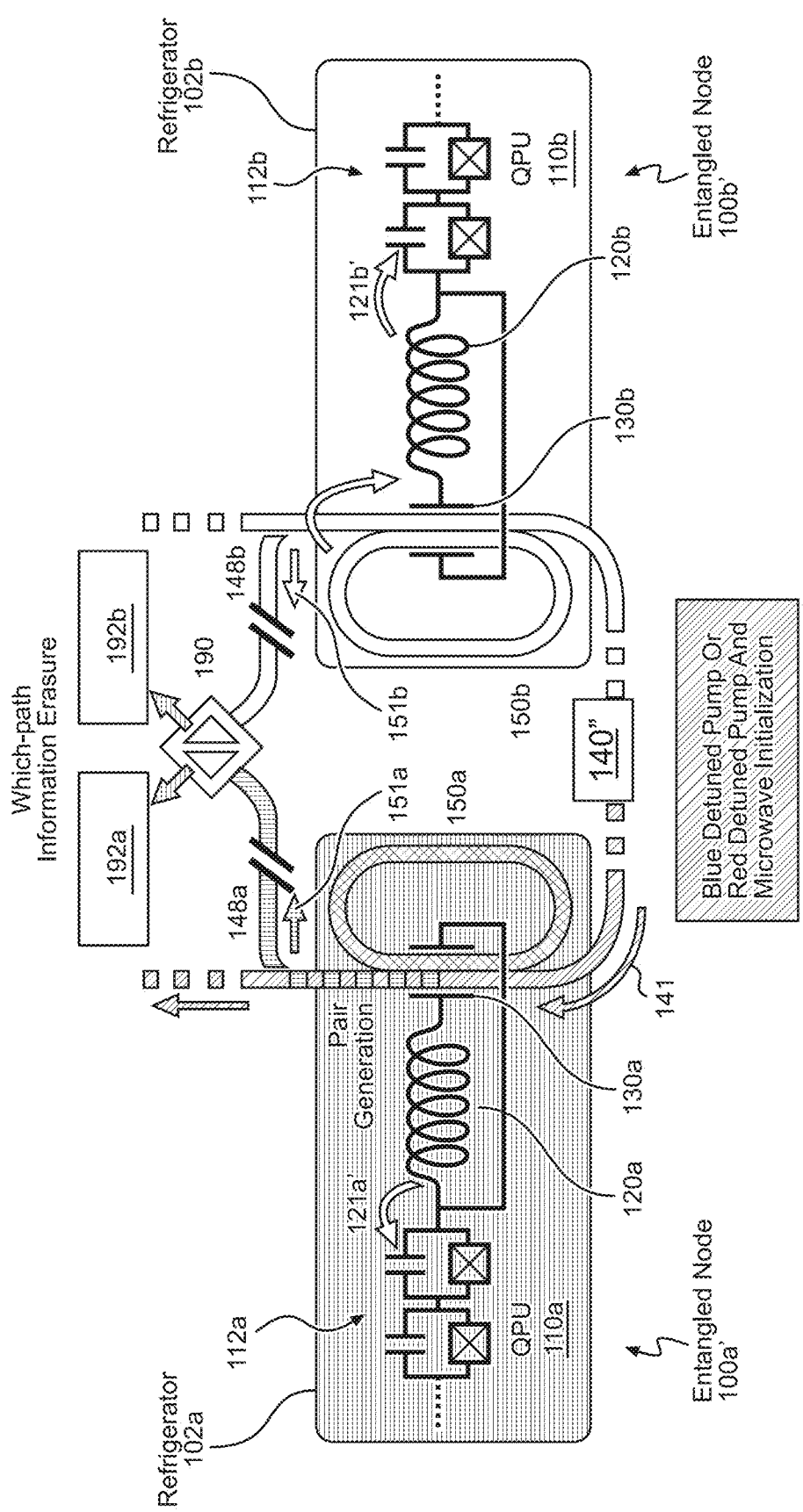

FIG. 1C illustrates superconducting quantum nodes that are coupled to pump that is blue- or red-detuned from the optical mode of the nodes' optical resonators and to a beam splitter for optically heralded entanglement. A blue-detuned pump creates pairs of microwave/optical photons. By detecting the optical photons after erasing the path information we can herald entanglement between the microwave oscillators. This is a high-fidelity, low-efficiency probabilistic operation.

Figure 2A:
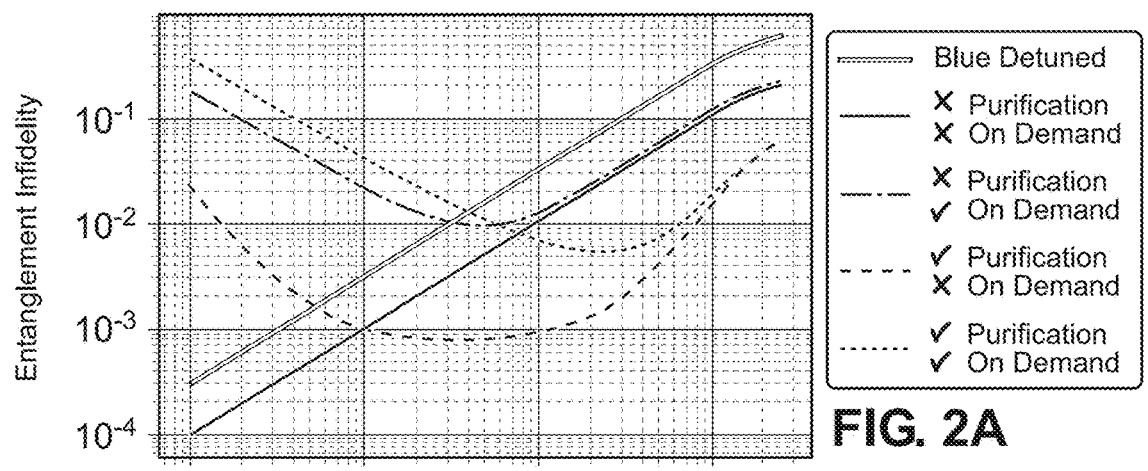

FIG. 2A shows the infidelity of a microwave Bell pair obtained using the nodes of FIG. 1C in different regimes. The blue-detuned "squeezing" implementation has higher infidelity due to populating higher-than-one-photon states (upper solid line). The red-detuned "beam splitter" implementation involves preparing the microwave resonator in the 1) state but does not suffer from the aforementioned excitations. The other lines represent the red-detuned approach followed by purification and/or storage for on-demand use. Besides the $\sim g/\gamma$ infidelity in the solid traces, storage at low generation-rates causes an infidelity floor, due to finite microwave lifetime. Similarly, purification can be detrimental at low rates due to having to wait for a second pair to be generated.

Figure 2B:
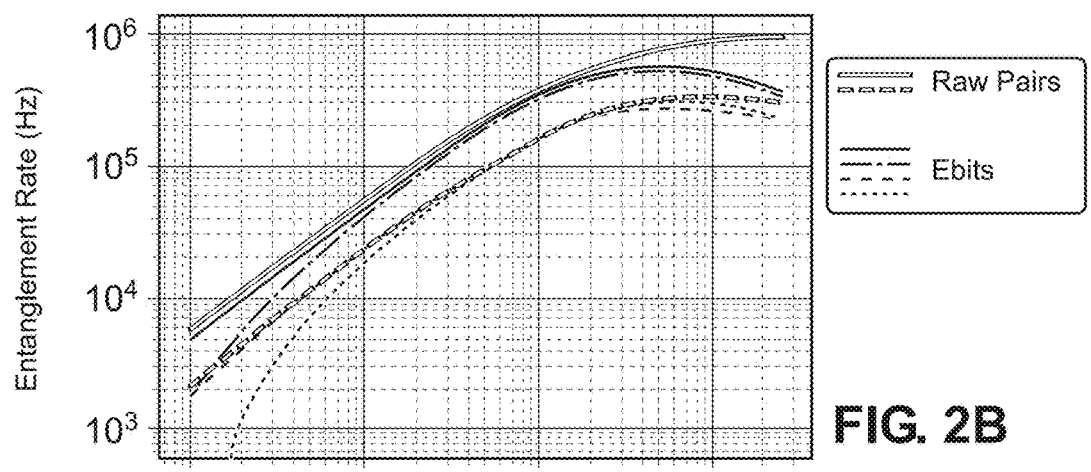

FIG. 2B shows the rates of entanglement generation (upper solid and dashed lines) and equivalent ebit generation, i.e., the hashing yield (lower solid and dashed lines) for the red-tuned regimes of FIG. 2B. Purification causes a drop in the entanglement rate and that the ebit rate suffers at high infidelities. At high entanglement rates, the curves flatten out due to the finite time for resetting the microwave resonators in the nodes of FIG. 1C, e.g., by projective measurement of algorithmic cooling.

Figure 2C:
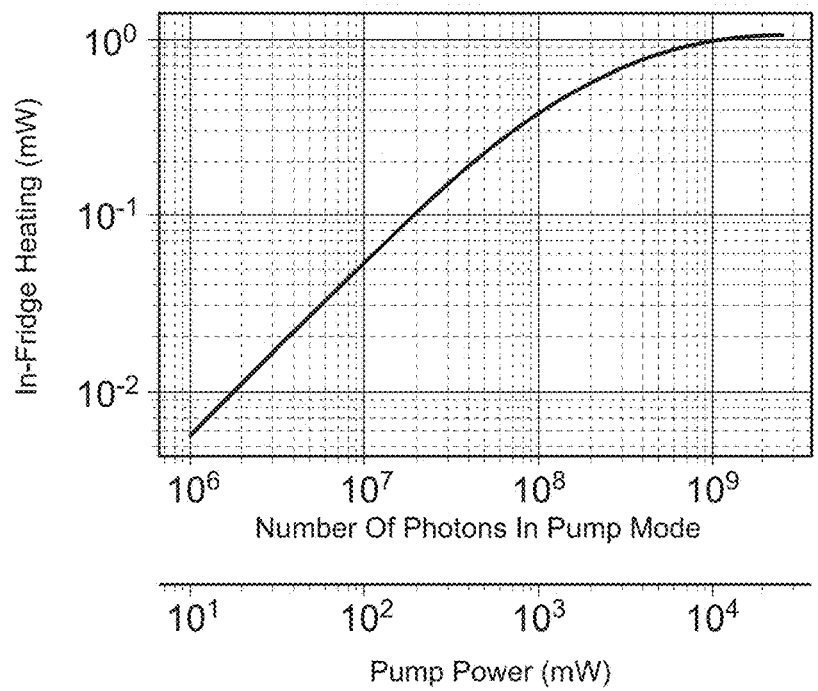

FIG. 2C gives the in-fridge heating due to the intrinsic loss of the optical resonators in the nodes of FIG. 1C. Evaluated at coupling $g_0=1$ kH, optical extrinsic and intrinsic loss $\gamma_e = \gamma_i = 100$ MHz, microwave loss $\gamma_{MW}=1$ kHz, pump wavelength $\lambda_p = 1500$ nm, resonator material $LiNbO_3$ of n=2.3, microwave gate fidelity 0.999, and microwave resonator reset time of 1 μs, which are state of the art values. Mismatches in the coupling rates of the two nodes and detector dark count rates are assumed negligible. Errors in the 1) microwave state preparation before heralding is also not included.

Figure 3:
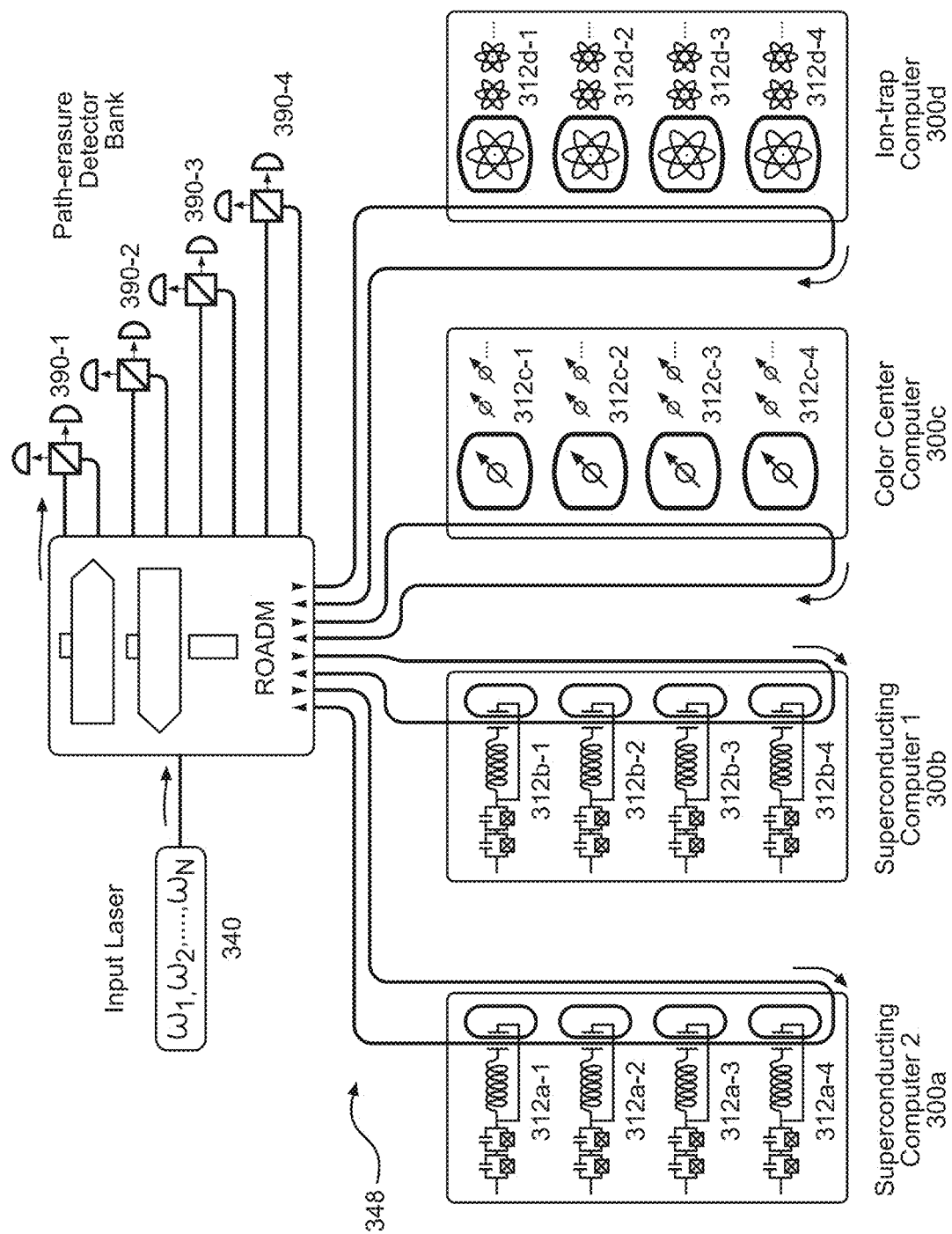

FIG. 3 illustrates connectivity among quantum nodes of different types and in different locations, including in different refrigerators. A reconfigurable optical add-drop multiplexer (ROADM) allows routes a frequency comb from a pump laser to qubits in the different quantum nodes. By connecting the ROADM to a bank of path-erasure detectors for each frequency channel, this design enables multiplexed heralded entanglement generation between multiple fridges of different quantum modalities. (Electro-optic modulators and attenuators are omitted for clarity.)

DETAILED DESCRIPTION

Our technology shares entanglement between distant quantum processing units (QPUs) or other entities by heralding entanglement generation between remote microwave photons. Our scheme uses spontaneous parametric down-conversion (SPDC) with electro-optic transducers tuned to the low-coupling regime, such that low-efficiency generation of a microwave- and optical-photon pair is the primary transduction process. By heralding the optical photons from two QPUs, we can entangle the accompanying microwave photons remaining in the microwave cavities in the QPUs. Hence, our scheme allows for high-fidelity entanglement in the same hardware used today for low-fidelity microwave-to-optical transduction (and vice versa). In other words, our technology replaces the high-probability, low-fidelity microwave-to-optical transduction process with a low-probability, high-fidelity heralding process. Our architecture can connect multiple QPUs across several quantum modalities to provide on-demand, multiplexed entanglement for a quantum network.

Optically Heralded Entanglement

FIGS. 1A-1C illustrate nodes with transduction hardware for low-efficiency, high-fidelity optically heralded entanglement. FIG. 1A shows a node 100 that includes a QPU 110 with several qubits 112 coupled to a microwave resonator 120, which can have a resonant frequency in the 1-10 GHz range and a cavity lifetime of tens of microseconds or more. In this case, the qubits 112 are superconducting qubits 112 that are inside a cryostat or refrigerator 102 that cools the qubits 112 to cryogenic temperatures (e.g., about 1 K). The microwave resonator 120 is also inside the refrigerator 102, as are a transducer 130 and an optical resonator 150, which can have a resonant frequency in the visible or infrared (e.g., in the telecom band) and a quality factor of about $10^4$ to $10^5$.

The transducer 130 couples the microwave resonator 120 to the optical resonator 150 and can take any of a variety of forms; for instance, it could include a piezoelectric material or a $\chi^{(2)}$ nonlinear material. The transducer 130 supports an optical mode and a microwave mode in a material that enables interaction of the optical mode with the microwave mode. Typically, this interaction is made possible through three-wave mixing, where the third wave is strong classical laser light (here, light 141 from a pump laser 140, described below). Modulating the strength of the classical light permits modulating the strength of the transduction coupling.

The transducer 130 and optical resonator 150 are also optically (e.g., evanescently) coupled to an optical waveguide 142 that runs through the refrigerator 102. The optical waveguide 142 connects the transducer 130 and optical resonator 150 to an optical pump laser 140 outside the refrigerator 102 (the optical pump laser 140 could also be inside the refrigerator 102, though this could increase the heat load on the refrigerator 102). The other end of the optical waveguide 142 splits into two, with one path terminating at an optical beam dump 144 and the other end providing an optical port 146.

In operation, the optical pump laser 140 emits a pulsed pump beam 141. The pump beam 141 can have a peak pulse power from 10-100 mW and a repetition rate of 100 kHz for superb entanglement quality (0.999 fidelity). Orders of magnitude improvements can reasonably be expected as the pump laser technology matures. The pulse durations should be high to provide a high duty cycle, with a limit imposed by a microwave reset operation performed between each pulse. This microwave reset can take many microseconds, so in typical operation the pulse duration can be microseconds or higher.

The waveguide 142 guides this pump beam 141 to the transducer 130, which transduces the pump photons into microwave photons and optical photons 151, also called heralding photons, as explained in greater detail below. The microwave photons and optical photons 151 may circulate in the microwave resonator 120 and optical resonator 150, respectively. The coupling between the optical waveguide 142 and optical resonator 150 is passive. The optical resonator 150 and the input/output waveguide 142 are structurally connected, which enables crosstalk between the two. The classical pump light 141 enters the optical resonator 150 because there is a lot of it in the waveguide 142. And the single heralding photon 151 simply leaks out of the optical resonator 150 into the waveguide 142 due to the finite lifetime of the optical resonator 150. The optical waveguide 142 guides the optical photons 151 from the optical resonator 150 and any excess pump photons 141' out of the refrigerator 102, where a dichroic beam splitter or other filter directs the excess pump photons 141' to the beam dump 144 and the optical photons 151 to the optical port 146.

FIG. 1B shows how two nodes 100a and 100b can be connected by an optical fiber 148 or other optical link to form at least part of a quantum network. The nodes 100a and 100b are in separate refrigerators 102a and 102b that may be in different parts of the same room, different parts of the same building, or even different countries or continents. The optical fiber 148 connects the nodes' optical ports 146a and 146b. The optical fiber 148 can be at temperatures above cryogenic temperatures (temperatures above 120 K, e.g., about 300 K) instead of being cooled to cryogenic temperature and can have a length of meters to kilometers.

Each node 100a, 100b includes its own QPU 110a, 110b, optical qubits 112a, 112b, microwave resonator 120a, 120b, transducer 130a, 130b, and optical resonator 150a, 150b. (The beam dumps are omitted for clarity.) The nodes 100a and 100b are coupled to the same optical pump laser 140', e.g., by optical fibers. The optical pump laser 141' is red-detuned with respect to the optical cavities 150a and 150b (i.e., the optical pump laser 141' emits light at a carrier frequency that is lower than the resonance frequencies of the optical carriers 150a and 150b) and can be collocated with either node 100*a* or 100*b* or located in separate location, possibly meters to kilometers away from the nodes 100*a* and 100*b*.

The optical nodes 100*a* and 100*b* in FIG. 1B are configured to exchange quantum information using microwave-to-optical and optical-to-microwave transduction. In FIG. 1B, the transducer 130*a* in node 100*a* converts a microwave photon 121*a* from qubits 112*a* into an optical photon 151' via a $\chi^{(2)}$ nonlinear interaction (sum-frequency generation) between the microwave photon 121*a* and the red-detuned pump beam 141'. The resulting optical photon 151' propagates through the waveguide 142*a* to the optical fiber 148, which guides it to the optical port 146*b* of the other node 100*b*. Waveguide 142*b* guides the optical photon 151' from the optical port 146*b* to the transducer 130*b*, which converts the optical photon 151' to another microwave photon 121*b* via a difference-frequency interaction with red-detuned pump photons 141'. This microwave photon 121*b* is encoded with the quantum information from the qubits 112*a* in the first node 100*a* and couples to the qubits 112*b* in the second node 100*b* via the microwave resonator 120*b*.

As explained above, the microwave-to-optical and optical-to-microwave transduction processes carried out by the transducers 130*a* and 130*b* in FIG. 1B tend to be efficient but noisy. Worse, increasing the efficiency of the transduction processes tends to increase the noise. The noise degrades the fidelity of the quantum information transfer.

FIG. 1C illustrates the nodes 100*a* and 100*b* configured for optically heralded entanglement instead of quantum information transfer by M-O-M transduction. Again, the nodes 100*a* and 100*b* are coupled to the same optical pump laser 140", which in this case can be blue- or red-detuned from (i.e., emits light at a higher or lower carrier frequency than) the resonance frequencies of the optical resonators 150*a* and 150*b* in the nodes 100*a* and 100*b*, respectively. The optical resonators 150*a* and 150*b* are tuned to the same (optical) resonance frequency, and the microwave resonators 120*a* and 120*b* are tuned to the same (microwave) resonance frequency. If desired, the microwave resonators 120*a* and 120*b* and the optical resonators 150*a* and 150*b* can be locked to the pump beam 141, which serves as a global frequency reference. The nodes' optical ports 146*a* and 146*b* are coupled to different input ports of a 2×2 beam splitter 190 via respective optical fibers 148*a* and 148*b*. The beam splitter's output ports are coupled to respective photodetectors 192*a* and 192*b*. The beam splitter 190 and photodetectors 192*a* and 192*b* can be at a temperature greater than 120 K (e.g., around 300 K).

The nodes 100*a* and 100*b* exchange quantum information using a modified version of the DLCZ protocol, which is named after Duan, Lukin, Cirac and Zoller, the authors who proposed it. The original DLCZ protocol exploits the simultaneous spontaneous Raman emission of photons from and creation of spin excitations in a pair of atomic ensembles to create entanglement between the pair of atomic ensembles. Either or both of the ensembles emits a photon, which is guided to a beam splitter whose outputs are coupled to respective detectors as in FIG. 1C. The beam splitter couples the photon to one of the detectors, which senses the photon, heralding excitation of one atomic ensemble. Coupling the photon to the detectors via the beam splitter erases information about which path the photon traveled to the beam splitter and hence which atomic ensemble emitted the photon and is excited. Simultaneous detection of a photon at each beam splitter output heralds excitation and entanglement of both atomic ensembles. For more on the original DLCZ protocol, please see L.-M. Duan, M. D. Lukin, J. I. Cirac, and P. Zoller, "Long distance quantum communication with atomic ensembles and linear optics," Nature 414, 413 (2001), which is incorporated herein by reference in its entirety.

In the modified version of the DLCZ protocol executed by the nodes 100*a* and 100*b*, the transducers 130*a* and 130*b* convert each blue-detuned pump photon 141" into a microwave photon 121*a*', 121*b*' and a correlated optical photon 151*a*, 151*b* via a nonlinear interaction as described below. Each optical photon 151*a*, 151*b* exits its optical resonator 150*a*, 150*b* and propagates to its corresponding input port on the beam splitter 190 via the corresponding waveguide 142*a*, 142*b*; optical port 146*a*, 146*b*; and optical fiber 148*a*, 148*b*. The optical photon 151*a*, 151*b* exits one of the beam splitter's output ports and is detected by the corresponding photodetector 192*a*, 192*b*. However, the mapping between the beam splitter's input and output ports is not deterministic; rather, this mapping varies in an unknown fashion over time, making it impossible to determine which input port the optical photon 151*a*, 151*b* arrived at from the output port at which the optical photon 151*a*, 151*b* is detected. Put differently, the beam splitter 190 erases information about which path the optical photon 151*a*, 151*b* took to the beam splitter 190 and hence which node 100*a*, 100*b* generated the optical photon 151*a*, 151*b*.

Detection of a single optical photon 151*a*, 151*b* by one of the photodetectors 192*a*, 192*b* heralds creation of a microwave photon 121*a*', 121*b*' at one of the nodes 100*a*, 100*b*. Detection of an optical photon 151*a*, 151*b* without the beam splitter 190 simply heralds the creation of a microwave photon at the corresponding node 100*a*', 100*b*'. Detection of an optical photon 151*a*, 151*b* after the beam splitter 190 heralds the creation of a microwave photon 121*a*', 121*b*', but without knowledge about the location of the microwave photon 121*a*', 121*b*'. The microwave photon 121*a*', 121*b*' is in a superposition of being at the left node 100*a*' or at the right node 100*b*'. The probability of two microwave photons 121*a*' and 121*b*' being created at the same time is very low and is a source of infidelity.

The operation of the nodes 100*a* and 100*b* shown in FIG. 1C can be described more formally as follows. A typical microwave-optical quantum transducer (e.g., transducer 130*a* or 130*b*) can use a $\chi^{(2)}$ nonlinear interaction between a classical optical pump mode $\hat{p}$ (e.g., pump beam 141"), an optical mode $\hat{a}$ (e.g., optical photon 151*a* or 151*b*), and a microwave mode $\hat{b}$ (e.g., microwave photon 121). The classical mode is red-detuned with respect to $\hat{a}$ leading to the Hamiltonian $$\hat{H} = \hbar g_0 \hat{p}^\dagger \hat{a}^\dagger \hat{b} + H.c.,$$

where $g_0$ is the single-photon nonlinear interaction rate and H.c. is the Hermitian conjugate. The pump mode $\hat{p}$ is in a coherent state with an amplitude high enough that it can be replaced by a classical field with the same amplitude $\hat{p} \rightarrow \sqrt{\langle n_p \rangle}$ where $\langle n_p \rangle$ is the average number of photons in the pump mode. This leads to a beam splitter-type Hamiltonian $\hat{a}^\dagger \hat{b} + H.c.$ that can be used for transduction. This transduction is deterministic, but its fidelity is low in practice due to the relatively low value of $g_0$ (e.g., about 1 kHz) compared to the various loss rates in the system.

If the pump mode $\hat{p}$ is instead blue-detuned with respect to the optical mode $\hat{a}$ the result is two-mode squeezing. This interaction generates pairs of optical and microwave photons via spontaneous parametric down-conversion (SPDC):

$$\hat{H} = \hbar g \hat{a} \hat{b} + H.c.,$$

$$g = g_0 \sqrt{\langle \tfrac{1}{n_p} \rangle}.$$

In either case the pump power, P, is related to the number of photons in the pump mode as $$\langle n_p \rangle = \frac{\gamma_e}{\omega_{MW}^2 + (\gamma_e + \gamma_i)^2} \frac{P}{\hbar\omega},$$

where $\gamma_e$ is the extrinsic loss rate of the optical mode and $\gamma = \gamma_e + \gamma_i$ is the sum of the extrinsic and intrinsic loss rates. Here $\omega$ denotes the frequency of the pump and $\omega_{MW}$ denotes the frequency of the microwave resonator.

If the optical mode is coupled to a waveguide ending with a photodetector, this system can herald the production of a single microwave photon by detecting a single optical photon. First, we disclose the performance of this procedure, and then we disclose how it enables the heralding of entanglement between two remote microwave systems (e.g., nodes 100a and 100b in FIG. 1C).

The collapse operator that describes the detection of the optical photon is $\hat{c} = \sqrt{\gamma_e}\hat{a}$, which leads to a stochastic master equation with non-Hermitian effective Hamiltonian given by $$\hat{H} = \hbar g \hat{a}\hat{b} + H.c. + i\hbar \frac{\gamma_e}{2}\hat{a}^\dagger \hat{a}.$$

To start, consider the intrinsic loss rate $\gamma_i$ to be negligible and investigate the waveguide coupling rate $\gamma_e$ (non-zero $\gamma_i$ reduces the detection efficiency but not the fidelity). The loss rate $\gamma$ is typically much larger than g, which simplifies the dynamics. This hardware constraint leads to poor fidelity in even state-of-the-art transduction devices. On the other hand, in our heralding protocol, $g \ll \gamma$ is used for high-fidelity operation, as it ensures the SPDC process is not polluted by higher-number excitations. However, it also limits the rate of photon generation. The lifetime of the microwave oscillator is orders of magnitude longer than the characteristic times of the dynamics studied here and can be considered infinite in the initial analysis. Once we have the desired heralded state in the microwave mode, we swap it out into one of the qubits of the superconducting QPU (e.g., qubits 112a or 112b in QPU 110a or 110b)—a nonlinear operation at which transmon-based devices are very capable.

We denote a Fock state with $n_a$ photons in optical mode $\hat{a}$ and $n_b$ in microwave mode $\hat{b}$ as $|n_a n_b\rangle$. To obtain a $|11\rangle$ pair on which we can herald the single microwave photon we simply pump the system and let the Hamiltonian evolve, while waiting for a click at the detector (i.e., the detection of a photon 151a or 151b by either photodetector 192a or 192b in FIG. 1C). A click heralds the creation of single photon (e.g., microwave photon 121a' or 121b') in the microwave mode (a correct approximation as long as $g \ll \gamma_e$). Solving the dynamics gives a rate of photon generation under a continuous pump of $$r_0 \frac{4g^2}{\gamma_e} = \frac{4g_0^2 \langle n_p \rangle}{\gamma_e},$$

which gives $r_0 = 4\langle n_p \rangle\, 10^{-2}$ Hz at typical $g_0 = 1$ kH and $\gamma_e = 100$ MHz. In the case of nonzero $\gamma_i$ this becomes $$r_0 = \frac{4g_0^2 \langle n_p \rangle \gamma_e}{(\gamma_e + \gamma_i)^2},$$

due to the $\gamma_e/(\gamma_e + \gamma_i)$ drop in efficiency.

One way to derive this form for $r_0$ is to restrict oneself to the basis of $\{|00\rangle, |11\rangle\}$. For a state $|\psi\rangle = c_0|00\rangle + c_1|11\rangle$ we get the following ordinary differential equation (ODE):

$$\begin{pmatrix} \dot{c}_0 \\ \dot{c}_1 \end{pmatrix} = \begin{pmatrix} 0 & -ig \\ -ig^* & -\frac{\gamma_e}{2} \end{pmatrix} \begin{pmatrix} c_0 \\ c_1 \end{pmatrix} \quad (1)$$

which leads to $$\begin{pmatrix} c_0 \\ c_1 \end{pmatrix} = e^{-\frac{\gamma_e}{4}t} \begin{pmatrix} \frac{\gamma}{4g'}\cosh(g't) + \sinh(g't) \\ -i\frac{g}{g'}\sinh(g't) \end{pmatrix},$$

$$g' = \sqrt{\frac{\gamma_e^2}{4} - |g|^2}.$$

The stochastic master equation formalism gives the probability density of photon detections as $$\langle \psi(t)|\psi(t)\rangle \sim e^{(2g' - \frac{\gamma_e}{2})t} \sim e^{-\frac{4|g|^2}{\gamma_e}t},$$

which corresponds to a Poissonian process of rate $r_0$.

If we use the same coherent pump (e.g., pump beam 141" from pump laser 140") to drive two separate copies of this system (e.g., nodes 100a and 100b), we can herald the generation of a single microwave photon in either one of the systems. Erasing the which-path information carried by the heralding optical photon yields a superposition of the heralded microwave photon being in either node. Thus, we obtain the distributed microwave Bell pair $|01\rangle \pm |10\rangle$. The path-erasure is performed by the beam splitter 190 in FIG. 1C and the sign of the Bell pair is determined by which detector 192a or 192b clicks (detects an optical photon).

The rate at which these Bell pairs are generated is $$r_e = 2r_0 e^{-r_0 \Delta t} \frac{\Delta t}{\Delta t + t_r},$$

where $\Delta t$ is the duration of each pump pulse and $t_r$ is the time to reset of the microwave cavity after each attempt (typically on the order of 1 μs).

Optical Heralding Performance

FIGS. 2A-2C illustrate simulations of the performance of this heralding technique. FIG. 2A is a plot of the entanglement infidelity versus the pump power/number of pump mode photons for the nodes in FIG. 1C. The upper solid line in FIG. 2A represents the fidelity of the generated entanglement (extremely high by any standards). The lower solid, dashed, dotted, and dashed-dotted lines represent the generated entanglement with additional purification steps and/or considering memory infidelities for providing entanglement on-demand to independent consumer hardware. The dotted curve includes both purification and infidelity effects.

FIG. 2B is a plot of the entanglement rate $r_e$ after optimizing with respect to the pump pulse duration $\Delta t$ versus the pump power/number of pump mode photons for the nodes in FIG. 1C. This is a figure of merit that represents at the same time the fidelity of each generated microwave/optical photon pair and the rate at which such microwave/optical photon pairs are generated. The "raw pairs" curves present the rate at which entangled pairs are generated, and the "ebit" curves present a theoretical measure of equivalent rate of generation of perfect entangled pairs. Many low-quality microwave/optical photon pairs are in a way equivalent to one high-quality microwave/optical photon pair (this statement is not rigorous but it provides correct intuition).

FIG. 2C shows the in-fridge heating caused by absorption of the optical power that leaks out of the optical resonator as a function of the pump power/number of pump mode photons for the nodes in FIG. 1C. It should be balanced against the entanglement curves in FIG. 2A.

As discussed above, the rate of entanglement generation drops if the intrinsic optical loss is non-negligible, by a factor of $\gamma_e/(\gamma_e+\gamma_i)$, without degrading the fidelity of the obtained Bell pair. The fidelity may be less than unity outside of the $g \ll \gamma$ approximation for two reasons: (1) the SPDC process can excite higher-than-one-photon states (i.e., there is a small chance of generating two microwave photons and two optical photons from the same node); and (2) the microwave resonator that was not heralded upon may have a small amplitude $c_1/\sqrt{|c_0|^2+|c_1|^2}$ of being excited too. Both of these infidelities scale as $g/\gamma$.

While the excitation of the non-heralded cavity may be unavoidable, the higher-photon-number error can be sidestepped using the following method: instead of a blue-detuned pump, use a red-detuned pump as used in transduction; however, reset the microwave cavity to the $|1\rangle$ state. In other words, use the pump to transform a microwave photon into an optical photon using the red-detuned pump and the microwave resonator initialized in the $|1\rangle$ state. This leads to the same ODE as seen in Eq. (1); however, the basis for the evolving state is $|\psi\rangle = c_0|01\rangle + c_1|10\rangle$. Given that this Hamiltonian preserves the total photon number, it should be impossible to excite states outside of the $\{|01\rangle, |10\rangle\}$ subspace. The same protection can also be implemented by keeping the blue-detuned version of the Hamiltonian and using a strongly anharmonic microwave resonator, such that two-photon excitation is suppressed. As seen in FIG. 2A, this leads to a notable drop in infidelity; however, the issue of partially exciting the non-heralded resonator persists leading to a residual infidelity scaling as $g/\gamma$.

With typical hardware parameters seen in today's state-of-the-art devices, we can obtain pair generation rates of 100 kHz at fidelities of 0.99, while suffering 0.1 mW of in-fridge heating due to leakage from the pump. This estimate accounts for the finite lifetimes of the optical and microwave cavities. Through simple single-stage purification performed on the microwave superconducting quantum computer, the infidelity can be lowered by an order of magnitude with a rate decrease of slightly more than 2×. The fidelity after purification may be chiefly limited by the gate-fidelity of the superconducting quantum computer performing the purification. At gate fidelities of 99% the usability of purification is rather limited as the raw entanglement already reaches that level; however, FIG. 2A shows that with gate fidelities of 99.9% the purification provides for drastically higher entanglement fidelity while lowering entanglement rate by only a factor of approximately two. Lastly, at low entanglement rates the entanglement fidelity reaches a floor and starts to worsen because at such low rates the entangled microwave state should be stored for a time comparable to the lifetime of the microwave cavity.

The entanglement rate scales as $$\frac{\gamma_e^2}{(\gamma_e+\gamma_i)^2(\omega_{MW}^2+(\gamma_e+\gamma_i)^2)},$$

which is maximal at $\gamma_e \approx \gamma_i$. However, this also leads to only $\gamma_e/(\gamma_e+\gamma_i)=50\%$ of generated photons reaching the photodetector. Due to missing half of the heralding events, the microwave cavity should be reset after each attempt, resulting in a roughly 1 μs delay that limits the maximal rate as seen in the rate plot in FIG. 2B. If we use a two-cavity resonator, thus having a dedicated resonator for the pump mode, we can have $\gamma_e = \gamma_i$ for the classical pump mode, while having $\gamma_e \gg \gamma_i$ for the heralding mode. In other words, in addition to physically distinct optical and microwave resonators, a node could include an extra optical resonator, dedicated just to the pump beam (which can be strong enough to couple into the system even if it is not perfectly resonant), to permit more freedom in choosing the coupling parameters. This would let us forgo resetting the microwave resonator in the blue-detuned version of our protocol, but it could also significantly lower the entanglement rate.

In summary, at high entanglement rates (high pump powers) the fidelity of entanglement falls due to undesired excitations in the non-heralded cavity, while at low rates the fidelity falls because the entangled pair is stored for a long time in the microwave resonator. If we want higher rates of entanglement generation, we can counteract the drop in fidelity by performing purification. However, pushing for rates higher than 100 kHz could cause heating due to leakage from the pump higher than 0.1 mW.

To improve the resilience against this heating we can operate the microwave-optical transducer at a temperature of 1 K, while radiatively coupling the microwave cavity mode to a lower-temperature 10 mK thermal bath. If the microwave mode is over-coupled to the cold bath, then the thermal mode occupancy may be dominated by the 10 mK occupancy rather than the 1 K occupancy. This allows us to utilize the greater cooling power of a 1 K refrigerator (e.g., 360 mW of cooling power at 1 K, compared to typical cooling power of 12 μW at 20 mK) while the noise is dominated by that of the colder stage.

This analysis neglects dark count detector errors because they are orders of magnitude lower than other error floors, with dark count rates much lower than 1 kHz. Mismatches in the $\gamma_e$ coupling rates between the two nodes could lead to a coherent error in which the heralded Bell pair is not a perfectly equal superposition of $01\rangle$ and $10\rangle$, so a high-fidelity hardware implementation may benefit from in situ calibration of the coupling rates.

Heralding Entanglement Among Diverse Quantum Devices

Our approach extends to heralding entanglement between a diverse set of quantum devices. To do this, we can multiplex the entanglement heralding over multiple frequency channels, thus improving the entanglement generation rate. We can also use our techniques to entangle different quantum modalities, for example, entangling a superconducting device (where the pump, under a $\chi^{(2)}$ interaction, creates a state $|00\rangle + \varepsilon|11\rangle$) and a trapped ion device (where a conditional reflection of an attenuated pump from a $|+\rangle$ ion state creates a state $|0+\rangle + \varepsilon|1-\rangle$) in which after path erasure we obtain the entangled microwave-ion pair $|0+\rangle \pm |1-\rangle$. It can also herald the entanglement of the microwave cavity with a flying photon: one of the nodes is of the architecture shown in FIGS. 1A-1C, while the other node uses the pump in a SPDC photon pair generation experiment calibrated to have the same generation rate. In other words, one of the nodes can employ a microwave-optical $\chi^{(2)}$ process while the other node employs a purely optical $\chi^{(2)}$ process, leading to heralding the entanglement of a microwave qubit and a flying optical qubit (in the single-rail basis).

FIG. 3 shows a quantum optical network that can implement the DLCZ protocol in many different modalities, with multiplexing over time, space (optical fiber), pump wavelength, and/or heralding photon wavelength, provided that the pump frequency equals the sum of the frequencies of the generated optical/microwave photon pair. The quantum optical network includes nodes 300a-300d of different types connected via optical fibers 348 and a reconfigurable optical add-drop multiplexer (ROADM) 380, which switches photons of different color among the different optical fibers 348.

Each node 300a-300d includes its own set of qubits, e.g., qubits 312a-1 through 312a-4 in node 300a. The nodes 300a-300d can be separated from each other by kilometers or more any may have qubits implemented using different technologies. In FIG. 3, for example, nodes 300a and 300b include superconducting qubits 312a and 312b with microwave resonators, transducers, and optical resonators in separate refrigerators like the nodes 100a and 100b in FIG. 1C. Node 300c includes a color-center computer with qubits 312c that are represented by the spin states of color centers or other spin defect centers in a solid-state host (e.g., nitrogen vacancies in diamond). And node 300d includes an ion-trap computer with qubits 312d represented as spin states of ions trapped in an optical lattice. Other potential qubit implementations include optically trapped Rydberg atoms. In this example, superconducting qubits 312a-1 and 312b-1 have optical resonators tuned to the same resonance frequency (or more precisely, blue- or red-detuned by the same amount from that resonance frequency), with color center qubit 312c-1 and trapped ion qubit 312d-1 also resonant at that resonance frequency. Likewise, qubits 312a-2 through 312d-2 are resonant at the same frequency, and so on.

The ROADM 380 also connects to a mode-locked laser 340 or bank of wavelength-division-multiplexed lasers and a bank of path-erasure detectors 390-1 through 390-4. The mode-locked laser 340 and/or path-erasure detector bank 390 can be located together or separately, with or separate from any of the nodes 300a-300d. (Electro-optic modulators, filters, attenuators, and/or other components are omitted for clarity. These components may shape optical photon wave packets from the different nodes to ensure that the optical photons are indistinguishable when detected for higher fidelity.) Each path-erasure detector 390-1 through 390-4 includes a beam splitter with a pair of input ports coupled to different outputs from the ROADM 380 and a pair of output ports coupled to respective photodetectors. In this example, there is one path-erasure detector per heralding photon frequency, which can be as close as a fraction of a gigahertz apart, hence we can have tens or even hundreds of them on a single telecom band.

In operation, the mode-locked laser 340 generates frequency comb with components or comb lines at frequencies of $\omega_1, \omega_2, \ldots \omega_N$. There can be one comb line per path-erasure detector 390 for spectrally multiplexing by the frequencies of the heralding photons or one comb line per pair of qubits for spectrally multiplexing by the frequencies of the pump pulses. If the pump pulses are at the same frequency and the heralding photons are at different frequencies, then qubits in the different nodes are also spectrally multiplexed.

The ROADM 380 can be configured to route pump pulses to two of any four qubits (e.g., qubits 312a-1 and 312c-1) at the same spectral channel for generating a heralding photon from one of the connected qubits. The ROADM 380 routes the heralding photon to path-erasure detector (e.g., path-erasure detector 390-1) for detecting entanglement between the connected pair of qubits. The beam splitters and photodetectors detect the photons without sensing the photons' origins (only that there are two possible source nodes 300a-300d for each photon). Each detection heralds entanglement of the pair of qubits coupled via the ROADM 380. By connecting the ROADM 380 to the path-erasure detector 390 for the corresponding frequency channel, this design enables multiplexed heralded entanglement generation between multiple nodes 300a-300d of different quantum modalities.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein.

The foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A method of entangling a first superconducting qubit in a first node and a second superconducting qubit in a second node, the method comprising:
   generating a microwave photon and an optical photon at the first node;
   coupling the microwave photon to the first superconducting qubit;
   coupling the optical photon to a beam splitter in optical communication with the first node and the second node, the beam splitter erasing information about which of the first node and the second node generated the optical photon;
   detecting the optical photon with a photodetector coupled to an output of the beam splitter to herald entanglement of the first superconducting qubit with the second superconducting qubit;
   cooling the first superconducting qubit to below 120 K in a first refrigerator; and
   cooling the second superconducting qubit to below 120 K in a second refrigerator,
   wherein coupling the optical photon to the beam splitter comprises transmitting the optical photon over an optical link at a temperature above 120 K.

2. The method of claim 1, wherein generating the microwave photon and the optical photon comprises:
   coupling pulses from a pump laser to a first transducer in the first node and to a second transducer in the second node; and
   converting one of the pulses to the microwave photon and the optical photon with the first transducer in the first node.

3. The method of claim 2, wherein generating the microwave photon and the optical photon further comprises:
   generating the microwave photon at a resonance frequency of a microwave resonator coupled to the first superconducting qubit and to the first transducer; and
   generating the optical photon at a resonance frequency of an optical resonator coupled to the first transducer.

4. The method of claim 1, wherein generating the microwave photon and the optical photon comprises generating the microwave photon and the optical photon via a nonlinear medium and a pump photon at a frequency equal to a sum of a frequency of the microwave photon and a frequency of the optical photon.

5. The method of claim 1, wherein coupling the optical photon to the beam splitter comprises guiding the optical photon through an optical fiber with a length of at least 1 km.

6. The method of claim 1, wherein coupling the optical photon to the beam splitter comprises coupling the optical photon through a reconfigurable optical add-drop multiplexer (ROADM).

7. The method of claim 6, further comprising:
   generating another microwave photon and another optical photon at the first node;
   coupling the other optical photon to the beam splitter via the ROADM; and
   detecting the optical photon with the photodetector coupled to the output of the beam splitter to herald entanglement of the first superconducting qubit with a third qubit in a third node.

8. The method of claim 7, wherein the third qubit is one of a third superconducting qubit, a color center qubit, or a trapped ion qubit.

9. A quantum optical network comprising:
- a pump laser to generate at least a first pump photon and a second pump photon;
- a first node in optical communication with the pump laser and comprising a first superconducting qubit and a first transducer in electromagnetic communication with the first superconducting qubit and configured to generate a first microwave photon and a first optical photon from the first pump photon;
- a second node in optical communication with the pump laser and comprising a second superconducting qubit and a second transducer in electromagnetic communication with the second superconducting qubit and configured to generate a second microwave photon and a second optical photon from the second pump photon;
- a beam splitter in optical communication with the first node and the second node and configured to receive the first optical photon from the first node, to receive the second optical photon from the second node, and to erase information about which of the first node and the second node generated the first optical photon;
- a first photodetector in optical communication with a first output port of the beam splitter and configured to detect one of the first optical photon and the second optical photon;
- a second photodetector in optical communication with a second output port of the beam splitter and configured to detect the other of the first optical photon and the second optical photon, detection of the first optical photon and/or the second optical photon heralding entanglement of the first superconducting qubit with the second superconducting qubit;
- a first refrigerator to cool the first superconducting qubit to below 120 K; and
- a second refrigerator to cool the second superconducting qubit to below 120 K.

10. The quantum optical network of claim 9, wherein the first pump photon is at a frequency equal to a sum of a frequency of the first microwave photon and a frequency of the first optical photon.

11. The quantum optical network of claim 9, wherein the first node comprises a first optical resonator coupled to the first transducer and the pump laser is blue-detuned from resonance with the first optical resonator.

12. The quantum optical network of claim 11, wherein the first node comprises a first microwave resonator coupled to the first transducer.

13. The quantum optical network of claim 11, wherein the second node comprises a second optical resonator having a resonance frequency equal to a resonance frequency of the first optical resonator.

14. The quantum optical network of claim 9, wherein the first node is coupled to the beam splitter via an optical fiber having a length of at least 1 km.

15. The quantum optical network of claim 9, further comprising:
- a reconfigurable optical add-drop multiplexer (ROADM), in optical communication with the first node, the second node, and the beam splitter, to couple the first optical photon from the first node to the beam splitter and/or to couple the second optical photon from the second node to the beam splitter.

16. The quantum optical network of claim 15, further comprising:
- a third node, in optical communication with the ROADM, to generate a third optical photon for heralding entanglement of a third qubit in the third node with one of the first superconducting qubit or the second superconducting qubit.

17. The quantum optical network of claim 16, wherein the third qubit is one of a third superconducting qubit, a color center qubit, or a trapped ion qubit.

18. A method of entangling a first superconducting qubit in a first node and a second superconducting qubit in a second node, the method comprising:
- generating a microwave photon and an optical photon at the first node;
- coupling the microwave photon to the first superconducting qubit;
- coupling the optical photon to a beam splitter in optical communication with the first node and the second node, the beam splitter erasing information about which of the first node and the second node generated the optical photon, wherein coupling the optical photon to the beam splitter comprises coupling the optical photon through a reconfigurable optical add-drop multiplexer (ROADM);
- detecting the optical photon with a photodetector coupled to an output of the beam splitter to herald entanglement of the first superconducting qubit with the second superconducting qubit;
- generating another microwave photon and another optical photon at the first node;
- coupling the other optical photon to the beam splitter via the ROADM; and
- detecting the other optical photon with the photodetector coupled to the output of the beam splitter to herald entanglement of the first superconducting qubit with a third qubit in a third node.

19. The method of claim 18, wherein the third qubit is one of a third superconducting qubit, a color center qubit, or a trapped ion qubit.

* * * * *